United States Patent
Yoshida

(10) Patent No.: US 7,551,947 B2
(45) Date of Patent: Jun. 23, 2009

(54) COMMUNICATION TERMINAL HAVING ENTRY DATA SECRET FUNCTION AND INCOMING CALL NOTIFICATION CONTROL METHOD OF THE SAME

(75) Inventor: Katsuhiko Yoshida, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 450 days.

(21) Appl. No.: 11/090,986

(22) Filed: Mar. 24, 2005

(65) Prior Publication Data

US 2006/0172779 A1    Aug. 3, 2006

(30) Foreign Application Priority Data

Jan. 28, 2005    (JP) ............................. 2005-021836

(51) Int. Cl.
   *H04M 1/00*    (2006.01)
(52) U.S. Cl. ...................................... 455/567; 455/410
(58) Field of Classification Search ................ 455/567, 455/410, 67.11, 414.1, 566, 412.2
   See application file for complete search history.

(56) References Cited

U.S. PATENT DOCUMENTS

| | | | |
|---|---|---|---|
| 5,946,636 A * | 8/1999 | Uyeno et al. ................. 455/566 |
| 6,217,764 B1 * | 4/2001 | Bellhouse ............... 210/321.69 |
| 6,252,515 B1 * | 6/2001 | Mottier et al. ................. 340/7.6 |
| 6,662,020 B1 * | 12/2003 | Aaro et al. ................. 455/552.1 |
| 6,799,052 B2 * | 9/2004 | Agness et al. ............. 455/456.4 |
| 6,954,657 B2 * | 10/2005 | Bork et al. .................. 455/567 |
| 7,212,840 B2 | 5/2007 | Nakamura |
| 7,266,397 B2 | 9/2007 | Sato et al. |
| 2003/0220099 A1 * | 11/2003 | Hama .......................... 455/415 |
| 2005/0014534 A1 * | 1/2005 | Hareng et al. ................ 455/567 |
| 2005/0144237 A1 * | 6/2005 | Heredia et al. .............. 709/206 |
| 2005/0170828 A1 | 8/2005 | Nakamura et al. |
| 2006/0105743 A1 * | 5/2006 | Bocking et al. ............. 455/411 |
| 2006/0116175 A1 * | 6/2006 | Chu ........................... 455/567 |

FOREIGN PATENT DOCUMENTS

| | | |
|---|---|---|
| EP | 0 989 714 A1 | 3/2000 |
| JP | 07-143225 A | 6/1995 |
| JP | 11-308360 A | 11/1999 |
| JP | 2000-307706 A | 11/2000 |
| JP | 2000-358086 A | 12/2000 |
| JP | 2001-217926 | 8/2001 |
| JP | 2002-368838 A | 12/2002 |

(Continued)

OTHER PUBLICATIONS

Japanese Office Action (and English translation thereof) dated Apr. 8, 2008, issued in a counterpart Japanese Application.

*Primary Examiner*—Blane J Jackson
(74) *Attorney, Agent, or Firm*—Frishauf, Holtz, Goodman & Chick, P.C.

(57) ABSTRACT

A communication partner to be kept secret is registered as a security member. When an incoming call has arrived, an incoming call notification operation is normally performed if the transmission source is not a security member. If the transmission source is a security member, no incoming call notification operation is performed. Instead, the display color of a clock always displayed in, e.g., the standby image is changed to a display color which the user himself or herself sets and he or she alone knows.

17 Claims, 14 Drawing Sheets

FOREIGN PATENT DOCUMENTS

| | | |
|---|---|---|
| JP | 2003-008705 A | 1/2003 |
| JP | 2003-46639 | 2/2003 |
| JP | 2003-333137 | 11/2003 |
| JP | 2004-080390 A | 3/2004 |
| JP | 2004-088796 A | 3/2004 |
| JP | 2004-096418 A | 3/2004 |
| JP | 2005-027282 A | 1/2005 |
| WO | WO 2004/107789 A1 | 12/2004 |

* cited by examiner

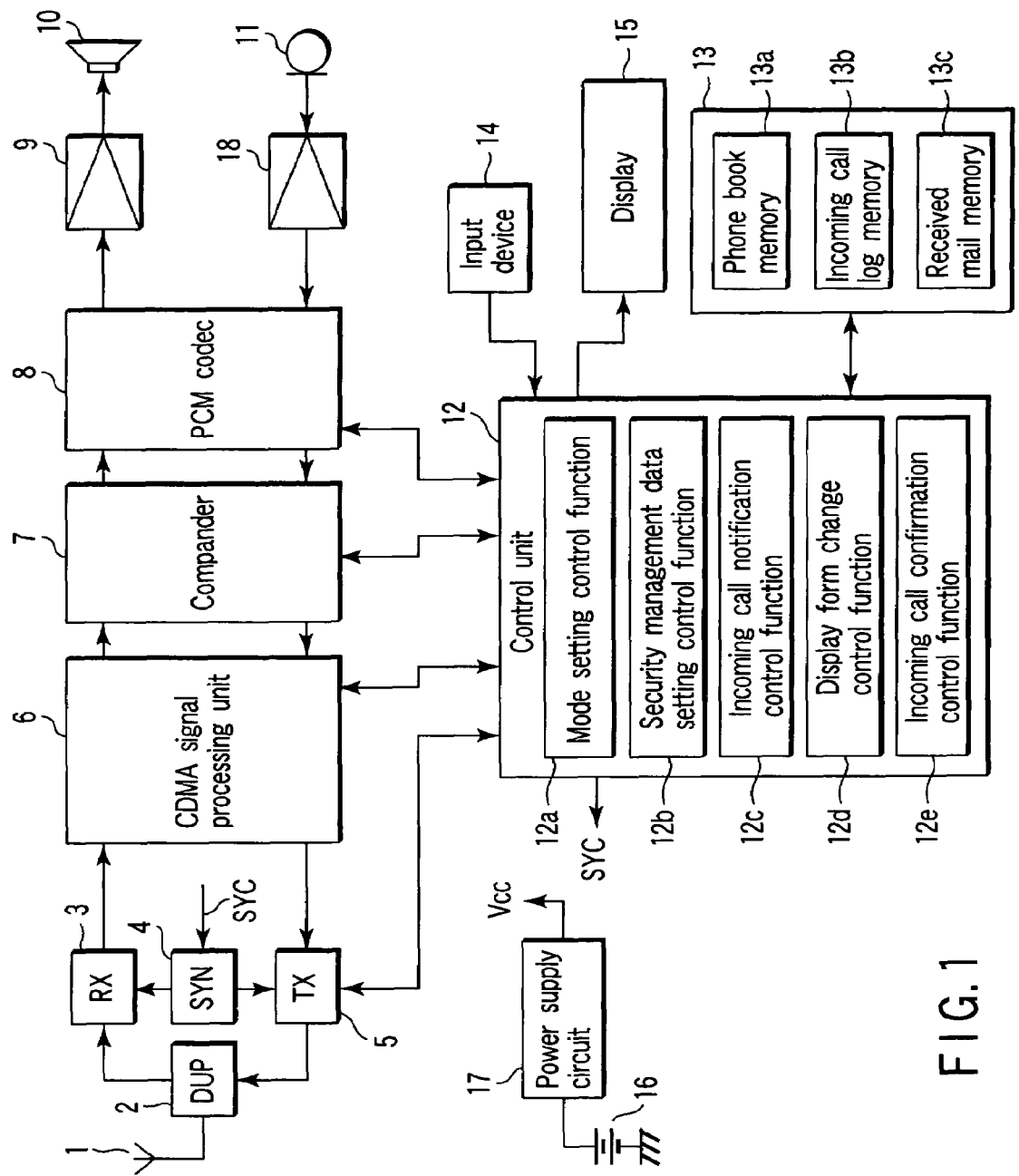
F I G. 1

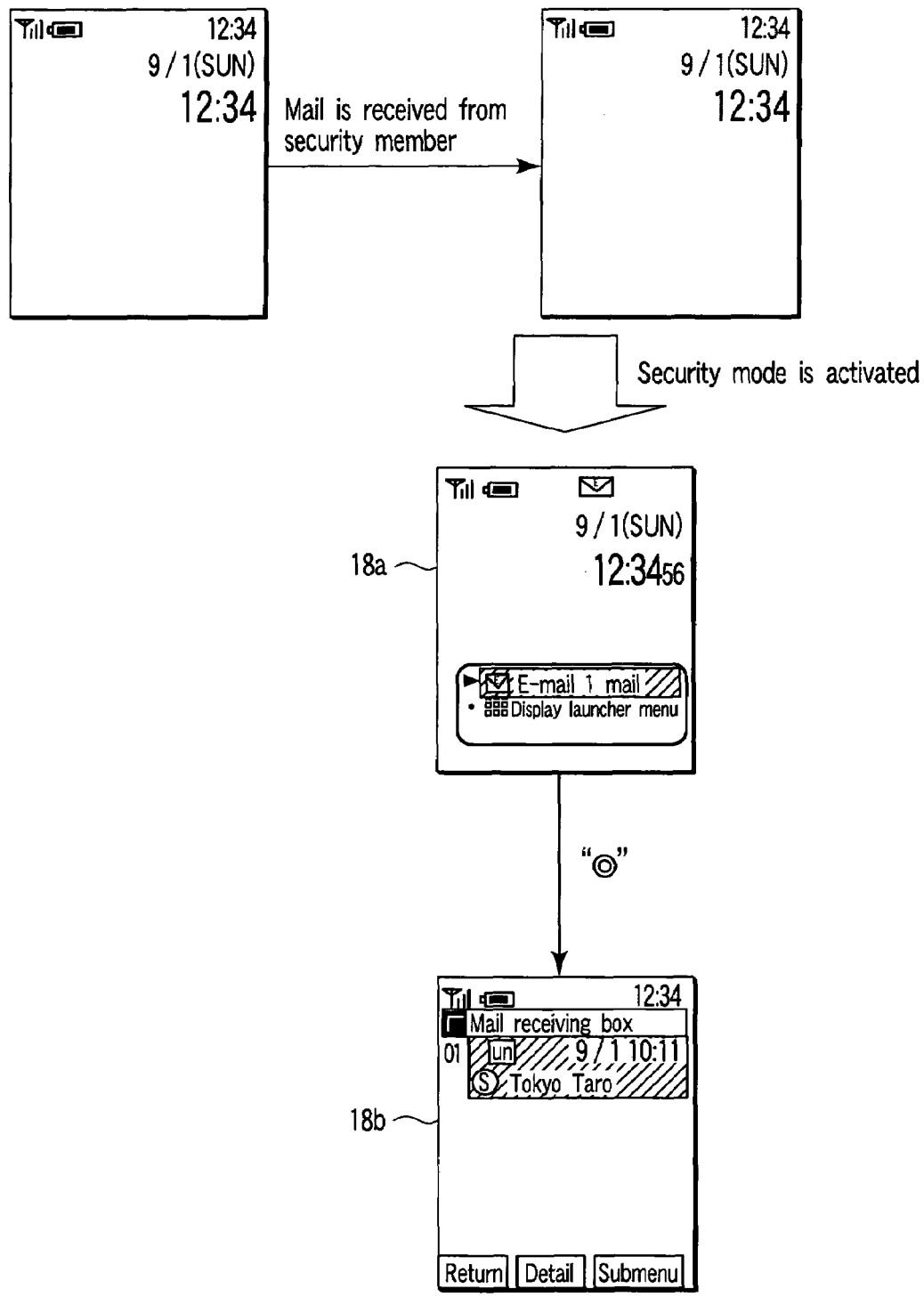
F I G. 18

US 7,551,947 B2

COMMUNICATION TERMINAL HAVING ENTRY DATA SECRET FUNCTION AND INCOMING CALL NOTIFICATION CONTROL METHOD OF THE SAME

CROSS-REFERENCE TO RELATED APPLICATIONS

This application is based upon and claims the benefit of priority from prior Japanese Patent Applications No. 2005-021836, filed Jan. 28, 2005, the entire contents of which are incorporated herein by reference.

BACKGROUND OF THE INVENTION

1. Field of the Invention

The present invention relates to a communication terminal such as a fixed phone, mobile phone, or personal digital assistants (PDA) and, more particularly, to a communication terminal having a function of setting, as an object to be kept secret, entry data stored in, e.g., an internal phone book or schedule book of the terminal, and limiting display of the data, and an incoming call notification control method of the communication terminal.

2. Description of the Related Art

Generally, a communication terminal such as a mobile phone or PDA has a phone book. By using this phone book, a user can place an outgoing call by a simple operation, i.e., only by selecting communication partner information stored in the phone book. Also, when an incoming call arrives, a user can confirm, e.g., the name of the transmission source by searching the phone book for communication partner information of the transmission source and displaying the information.

Communication partner information stored in the phone book is personal information. Therefore, it is very unpreferable, from the viewpoint of privacy protection, to allow a third party to freely see this communication partner information. For this reason, to increase the secrecy of communication partner information stored in the phone book, various types of communication terminals having secret functions have been proposed.

For example, Jpn. Pat. Appln. KOKAI Publication No. 2000-307706 discloses a technique by which a terminal user sets "display"/"non-display" to each communication partner information as an object to be kept secret. When an operation of displaying an outgoing call log or incoming call log is performed, outgoing call log information or incoming call log information corresponding to a communication partner set as "non-display" is not displayed.

Also, Jpn. Pat. Appln. KOKAI Publication No. 11-308360 discloses a technique by which a user sets "secret" and "display"/"non-display" to each communication partner information stored in a phone book. When mail is received from a communication partner set as "secret", the mail text is displayed if this communication partner is "display", and not displayed if the communication partner is "non-display".

In each of the above conventional communication terminals, when an incoming call has arrived or e-mail is received, the name of the calling person or the contents of the e-mail are not displayed. However, an incoming call notification operation of notifying the user of the arrival of the incoming call or a mail reception notification operation of notifying the user of the reception of the e-mail is performed. Therefore, a message indicating the arrival of the incoming call or the reception of the e-mail is displayed. Accordingly, if a third party borrows or steals this communication terminal, he or she knows that secret data is stored. This secret data may leak if the third person performs a secret canceling operation.

BRIEF SUMMARY OF THE INVENTION

Accordingly, an advantage of an aspect of the present invention to provide a communication terminal by which when an incoming call comes from a communication partner corresponding to secret entry data, not only this entry data but also the arrival of the incoming call is kept secret from a third party, thereby further raising the secrecy of the entry data, and an incoming call notification control method of the terminal.

To achieve the above advantage, one aspect of the present invention is to provide a communication terminal comprising a data memory which stores entry data, means for selectively setting entry data stored in the data memory as an object to be kept secret, and means for storing, when an incoming call has arrived, at least incoming call log data in a log memory, wherein when an incoming call has arrived, whether entry data corresponding to the transmission source is stored in the data memory is checked. If entry data corresponding to the transmission source is stored in the data memory, whether the stored entry data is set as an object to be kept secret is checked. If the stored entry data is set as an object to be kept secret, an incoming call notification operation which notifies a user of the incoming call is inhibited.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the circuit configuration of a mobile phone as an embodiment of a communication terminal according to the present invention;

FIG. 18 is a view showing the transition of the display screen when mail reception log data stored during the normal mode is to be checked;

DETAILED DESCRIPTION OF THE INVENTION

Figure 2:
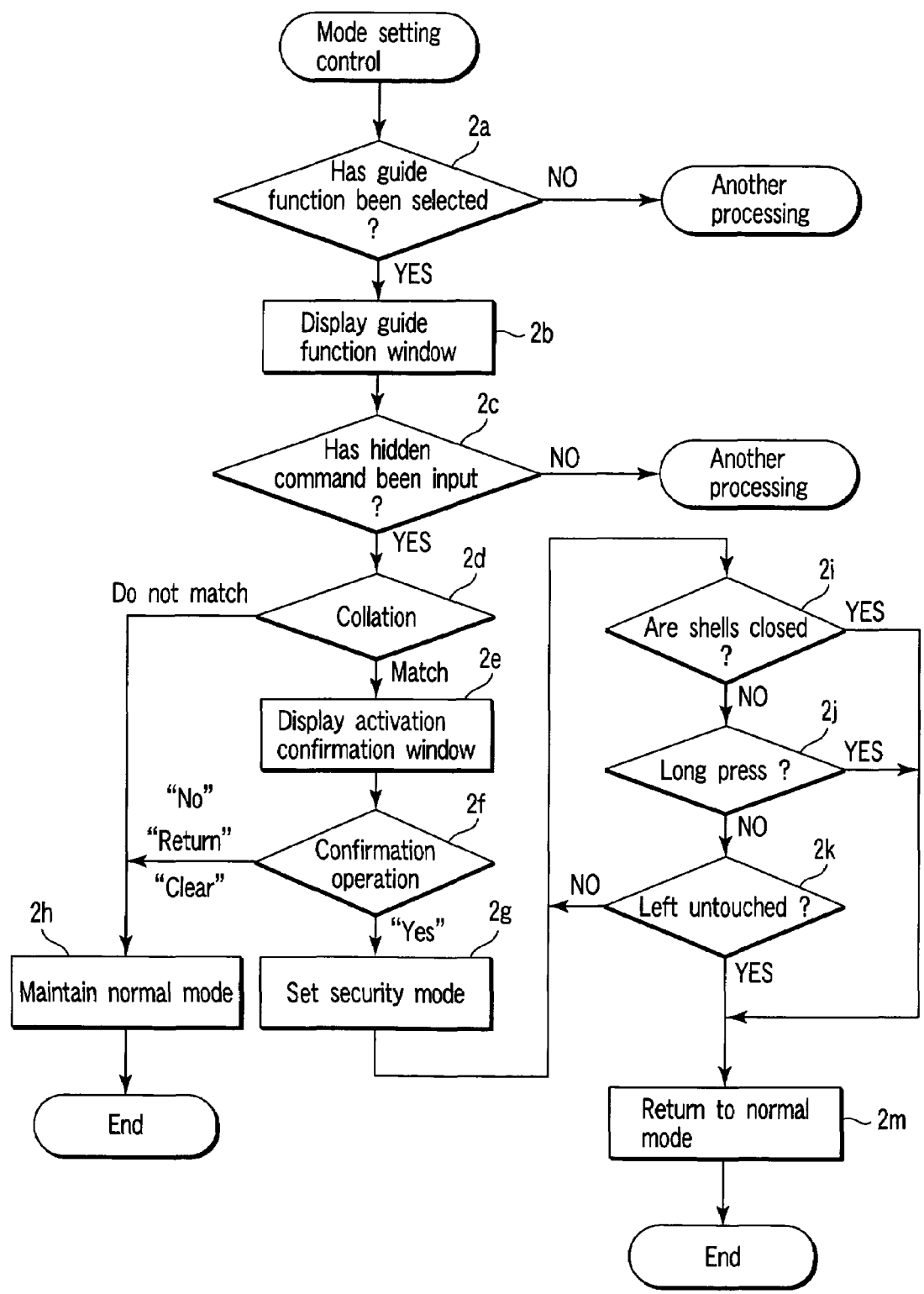
FIG. 2 is a flowchart showing the sequence and contents of mode setting control by the mobile phone shown in FIG. 1.

An embodiment of a communication terminal according to the present invention will be described below with reference to the accompanying drawing.

This embodiment will be explained below by taking, as an example, a folding-type mobile phone obtained by pivotally connecting a first housing (upper shell) and second housing (lower shell) via a hinge mechanism.

FIG. 1 is a block diagram showing the circuit configuration of the mobile phone according to this embodiment.

Referring to FIG. 1, a radio signal transmitted from a base station (not shown) is received by an antenna 1, and input to a receiving circuit (RX) 3 via a duplexer (DUP) 2. The receiving circuit 3 mixes the received radio signal with a local oscillation signal output from a frequency synthesizer (SYN) 4, thereby down-converting the signal into an intermediate-frequency signal. The receiving circuit 3 processes this intermediate-frequency signal by quadrature demodulation, and outputs a reception baseband signal. Note that the frequency of the local oscillation signal generated by the frequency synthesizer 4 is designated by a control signal SYC output from a control unit 12.

The reception baseband signal is input to a CDMA signal processing unit 6. The CDMA signal processing unit 6 includes a RAKE receiver. The RAKE receiver despreads a plurality of passes included in the reception baseband signal by using spread codes. The signals of these despread passes are synthesized after their phases are arbitrated. In this manner, reception packet data having a predetermined transmission format is obtained. This reception packet data is input to a compressing/expanding unit (to be referred to as a compander hereinafter) 7.

The compander 7 demultiplexes the output reception packet data from the CDMA signal processing unit 6 into media data by a multiplexer/demultiplexer. The compander 7 individually decodes these demultiplexed media data. For example, if audio data is contained in the reception packet data, this audio data is decoded by a speech codec. Also, if video data is contained in the reception packet data, this video data is decoded by a video codec.

A digital audio signal obtained by the decoding process is input to a PCM coding unit (to be referred to as a PCM codec hereinafter) 8. The PCM codec 8 decodes, by PCM, the digital audio signal output from the compander 7, and outputs an analog audio signal. This analog audio signal is amplified by an amplifier 9, and output from a loudspeaker 10.

A digital video signal decoded by the video codec of the compander 7 is input to the control unit 12. The control unit 12 displays the digital video signal output from the compander 7 on a display 15 via a video RAM. The display 15 is formed by a liquid crystal display (LCD). Note that the control unit 12 displays not only received video data but also video data of an image sensed by a camera (not shown) on the display 15 via the video RAM.

When the reception packet data is e-mail, the compander 7 outputs this e-mail to the control unit 12. The control unit 12 stores the e-mail in a mail receiving memory 13c of a storage unit 13. In accordance with a display operation performed on an input device 14 by the user, the control unit 12 reads the e-mail from the mail receiving memory 13c, and displays the read e-mail on the display 15. Note that the display 15 also displays, e.g., information indicating the operation mode of the apparatus, incoming call notification information, information indicative of the remaining life or charged state of a battery 16, and a clock indicating the present time.

A speech signal of a speaker input to a microphone 11 is amplified to an appropriate level by an amplifier 18, coded into a digital audio signal by PCM by the PCM codec 8, and input to the compander 7. Also, an output video signal from the camera (not shown) is converted into a digital signal by the control unit 12, and input to the compander 7. Note that e-mail formed by the control unit 12 is also input from the control unit 12 to the compander 7.

The compander 7 detects the energy amount of the input speech from the digital audio signal output from the PCM codec 8, and determines a transmission data rate on the basis of the detection result. Then, the compander 7 codes the digital audio signal into a signal having a format corresponding to the transmission data rate, thereby generating audio data. Also, the compander 7 codes the digital video signal output from the control unit 12, and generates video data. The multiplexer/demultiplexer multiplexes these audio data and video data in accordance with a predetermined transmission format to generate transmission packet data, and outputs this transmission packet data to the CDMA signal processing unit 6. Note that when e-mail is output from the control unit 12, this e-mail is also converted into packet data.

The CDMA signal processing unit 6 spreads the spectrum of the output transmission packet data from the compander 7 by using a spread code allocated to a transmission channel, and outputs the signal to a transmitting circuit (TX) 5. The transmitting circuit 5 modulates the signal having the spread spectrum by using a digital modulation method such as quadrature phase-shift keying (QPSK). The transmitting circuit 5 synthesizes the modulated transmission signal with the local oscillation signal generated from the frequency synthesizer 4, thereby up-converting the signal into a radio signal. Then, the transmitting circuit 5 amplifies the radio signal to a high frequency so that the transmission power level designated by the control unit 12 is obtained. The amplified radio signal is supplied to the antenna 1 via the duplexer 2, and transmitted from the antenna 1 to the base station.

The input device 14 has dial keys and function keys. The function keys include a transmission key, end key, power key, volume control key, mode designation key, and cursor key. A power supply circuit 17 generates, from an output from the battery 16, a predetermined operating power supply voltage Vcc, and supplies this voltage to the individual circuits. Note that the battery 16 is charged by a charging circuit (not shown).

The mobile phone of this embodiment includes the storage unit 13. The storage unit 13 uses, e.g., an EEPROM or hard disk as a storage medium, and includes a phone book memory 13a, an incoming call log memory 13b, and the mail receiving memory 13c.

The phone book memory 13a stores phone book data and schedule data. The phone book data is made up of communication partner information and a security flag. The communication partner information contains, e.g., the name, reading in kana, telephone number, mail address, and attribute information of a communication partner. The security flag identifies whether the communication partner is a security member. The incoming call log memory 13b stores telephone call log data. The mail receiving memory 13c stores received e-mail and e-mail reception log data.

The control unit 12 includes, e.g., a microcomputer. Also, as control functions according to the present invention, the control unit 12 has a mode setting control function 12a, security management data setting control function 12b, incoming call notification control function 12c, display form change control function 12d, and incoming call confirmation control function 12e. The functions 12a to 12e are implemented by allowing the microcomputer to execute programs.

The mode setting control function 12a sets the operation mode of the mobile phone to a normal mode or a security mode in accordance with an input operation by the terminal user. In the normal mode, not only the names and the like of communication partners registered as security members but also the existence of the security function is kept secret. In the security mode, the secret state described above is temporarily canceled to make it possible to change the settings of security management data (to be described later), and check the incoming call log or received mail related to security members.

Note that the definitions of the normal mode and security mode are not limited to those described above, or vice versa. That is, when the security mode is set, not only the names and the like of communication partners registered as security members but also the existence of the security function are kept secret. When the normal mode is set, the secret state described above is temporarily canceled to make it possible to change the settings of security management data (to be described later), and check the incoming call log or received mail related to security members.

The security management data setting control function 12b changes the settings of management data necessary to execute the security operation, if an input operation is performed on the input device 14 by the user while the operation mode of the mobile phone is set to the security mode by the mode setting control function 12a. The management data necessary to execute the security operation includes the security flag described above, and the display color of a clock displayed on the display 15.

The incoming call notification control function 12c checks, if a telephone call has arrived or e-mail is received, whether communication partner information corresponding to the transmission source is stored in the phone book memory 13a. If communication partner information corresponding to the transmission source is stored in the phone book memory 13a, the incoming call notification control function 12c checks whether this communication partner information is set as a security member. The incoming call notification control function 12c performs an incoming call notification operation if no communication partner information corresponding to the transmission source is stored in the phone book memory 13a, and if the communication partner information is not set as a security member. On the other hand, if the communication partner information is set as a security member, the incoming call notification control function 12c inhibits an incoming call notification operation.

The display form change control function 12d changes the display color of the clock if the incoming call notification control function 12c determines that the communication partner information is set as a security member.

The incoming call confirmation control function 12e checks the presence/absence of an unconfirmed telephone call or mail reception while the security mode is activated by the mode setting control function 12a. The incoming call confirmation control function 12e displays, on the display 15, a message indicating the arrival of an incoming call if an unconfirmed telephone call is present, and a message indicating the reception of mail if unconfirmed received mail is present. After that, the user is allowed to confirm the incoming call log data or received mail.

The operation of the mobile phone having the above arrangement will be explained below.

(1) Initial Settings After Purchase

Immediately after purchase, a default value of a hidden command is set in the mobile phone. The user first performs an operation of changing this default value of the hidden command to a unique value which he or she alone knows.

Figure 7:
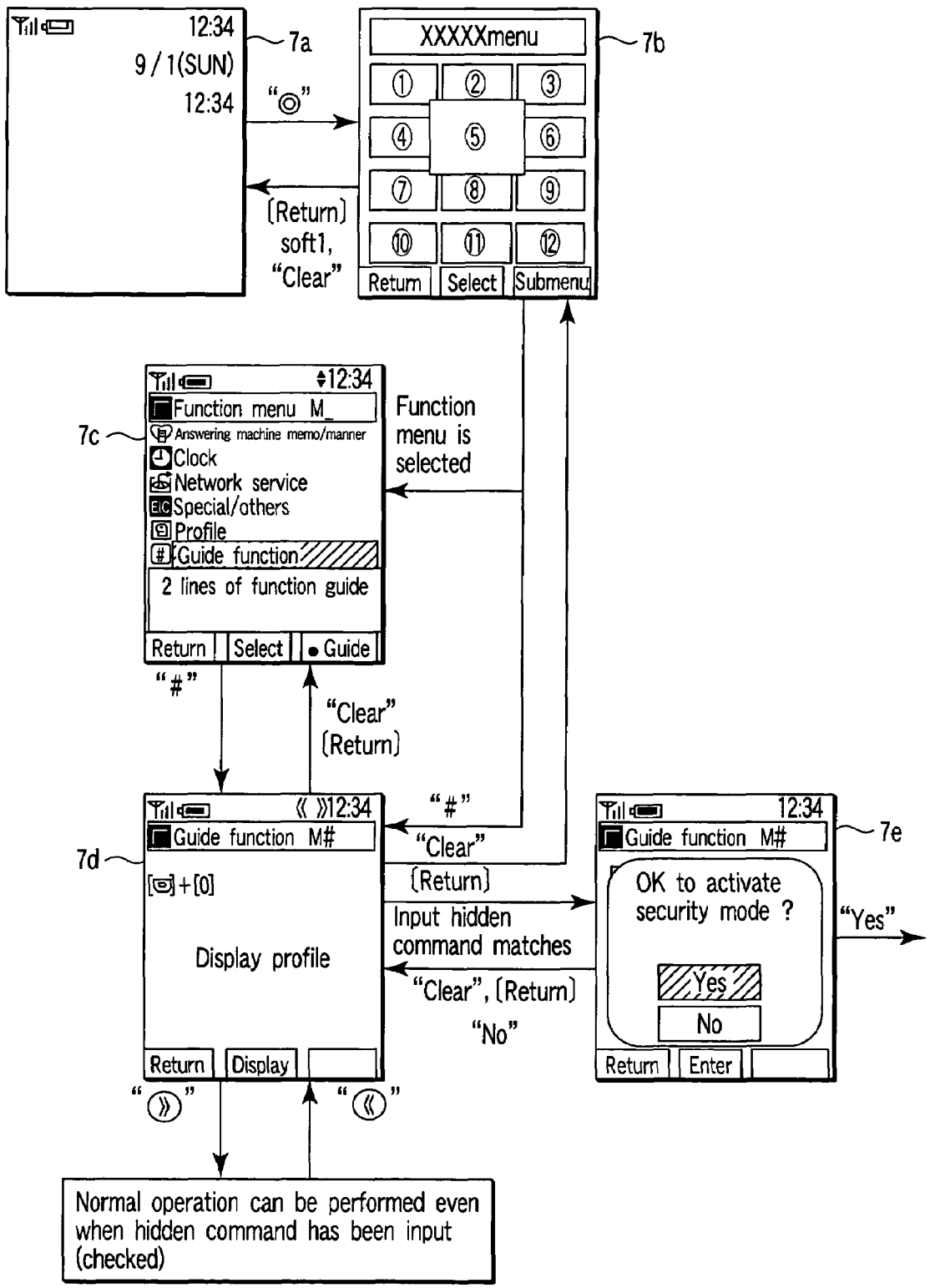
FIG. 7 is a view showing the transition of the display screen when a security mode is to be activated.

To change the hidden command, the security mode must be activated. FIG. 2 is a flowchart showing the sequence and contents of mode setting control. FIG. 7 is a view showing the transition of the display screen when the security mode is to be activated.

The user first displays a launcher menu 7b from a standby image 7a, and selects "function menu" from the launcher menu 7b. The user then selects "guide function" from a displayed function menu 7c, and inputs the default value of the hidden command in an input window 7d of the displayed guide function. The hidden command is, e.g., an arbitrary number of one to eight digits. The end of input of the number of one to eight digits is detected when a "#" key is pressed.

If the control unit 12 detects selection of the "guide function" in step 2a, the control unit 12 displays the guide function input window 7d in step 2b. When the default value of the hidden command is input, the flow advances from step 2c to step 2d, and the control unit 12 collates the input default value of the hidden command with a prestored default value. If the result of collation indicates that the two values match, the control unit 12 displays an activation confirmation window 7e in step 2e. If the user selects "yes" in this state, the flow advances from step 2f to step 2g, and the control unit 12 activates the security mode and returns to the standby image.

On the other hand, if the result of the hidden command collation indicates that the input hidden command and stored hidden command do not match, or if the user selects "no" in the activation confirmation window 7e or selects "return" or "clear", the control unit 12 maintains the normal mode in step 2h, and returns to the standby state.

Note that FIG. 7 shows the case in which input of the hidden command is accepted in the guide function input window 7d as an example. However, input of the hidden command may also be accepted in, e.g., another sub-menu window of the function menu, another menu window of the launcher menu, or the standby image.

Note also that if the user performs another operation during input of the hidden command, the hidden command input accepting process is interrupted, and another processing corresponding to the operation is executed. During or after the hidden command is input, the input hidden command or the stored hidden command is not displayed.

Figure 8:
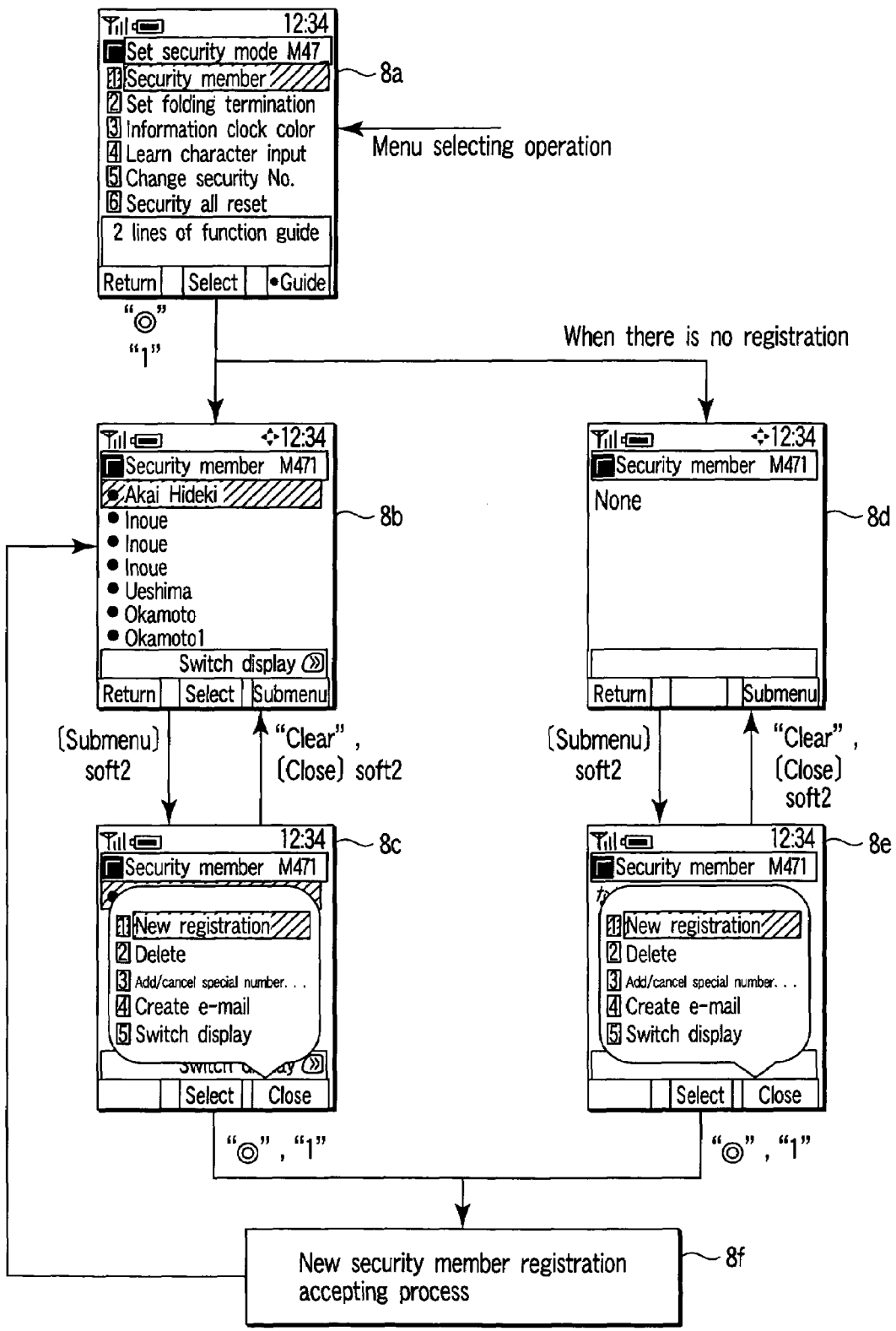
FIG. 8 is a view showing the transition of the display screen when a security member is to be registered.

When the security mode is activated, the user first selects "security mode set menu" from the standby image via the launcher menu. The user then selects "security number change" from the displayed security mode set menu (8*a* in FIG. 8). In the displayed security number change window, the user performs a registering operation by inputting an arbitrary hidden command determined by the user.

In this way, the hidden command unique to the user is set in the mobile phone in place of the default value of the hidden command set when the user purchased the mobile phone.

(2) Setting of Security Management Data (2-1) Setting of Security Member

To set a security member, as in the case in which the hidden command is to be changed, the user displays the launcher menu 7*b* from the standby image 7*a* as shown in FIG. 7, and selects "function menu" in the launcher menu 7*b*. The user then selects "guide function" from the displayed function menu 7*c*, and inputs the hidden command, which is set and registered beforehand by the user himself or herself, in the displayed guide function input window 7*d*.

As shown in FIG. 2, in step 2*d*, the control unit 12 collates the input hidden command with the prestored hidden command. If the result of collation indicates that the two commands match, the control unit 12 displays the activation confirmation window 7*e* in step 2*e*. If the user selects "yes" in this state, the flow advances from step 2*f* to step 2*g*, and the control unit 12 activates the security mode and returns to the standby image.

On the other hand, if the result of the hidden command collation indicates that the input hidden command and stored hidden command do not match, or if the user selects "no" in the activation confirmation window 7*e* or selects "return" or "clear", the control unit 12 maintains the normal mode and returns to the standby image as in the case of the hidden command change control described above.

When the security mode is activated, the user selects "security mode set menu" from the standby image via the launcher menu. As indicated by 8*a* in FIG. 8, the user selects "security member setting" in the displayed security mode setting menu.

Figure 3:
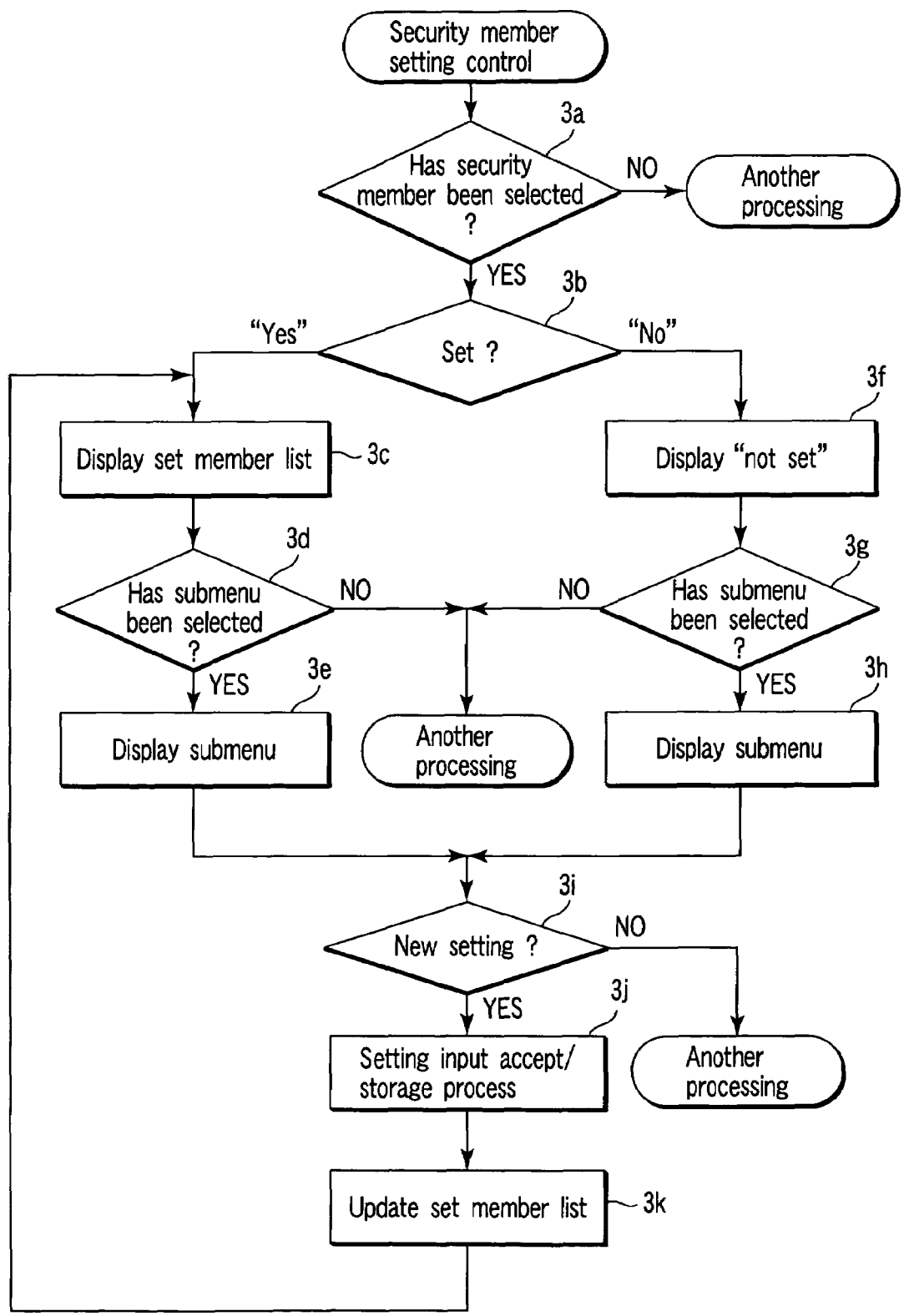
FIG. 3 is a flowchart showing the sequence and contents of security member registration control by the mobile phone shown in FIG. 1.

The control unit 12 executes a security member registration process following a control procedure shown in FIG. 3. That is, if "security member setting" is selected in step 3*a*, the control unit 12 checks in step 3*b* whether a security member is already set. If a security member is not set, the control unit 12 advances to step 3*f*, and displays "not registered" in a security member list display window as indicated by 8*d* in FIG. 8.

If the user selects "submenu" in this state, the control unit 12 advances from step 3*g* to step 3*h*, and displays a security member setting submenu 8*e*. If the user selects "new registration", the control unit 12 advances from step 3*i* to step 3*j*, and displays a new security member registration window. In this new security member registration window, as indicated by 8*f*, the user inputs the name, reading in kana, telephone number, mail address, and attribute information of a communication partner to be registered as a security member, in the same manner as the registration of communication partner information to the phone book. After completing the input, the user performs a determining operation. In response to this, the control unit 12 advances from step 3*j* to step 3*k*, and updates the security member list data. The control unit 12 then advances to step 3*c* to display the updated security member list data. An example of the data is indicated by 8*b* in FIG. 8.

To continue the registration of a security member in this state, the user selects "submenu". The control unit 12 advances from step 3*d* to step 3*e*, and displays a security member setting submenu 8*c*. If the user selects "new registration", the control unit 12 advances from step 3*i* to step 3*j*, and displays the new security member registration window. In this new security member registration window, as described previously, the user inputs the name, reading in kana, telephone number, mail address, and attribute information of another communication partner to be registered as a security member. Third or subsequent security members are also registered following the same control procedure as above.

When the user closes the shells of the mobile phone after completing the security member registration process described above, the control unit 12 detects that the shells have been closed in step 2*i* as shown in FIG. 2. The control unit 12 then advances to step 2*m* to terminate the security mode and return to the normal mode. Also, if the user continuously presses a predetermined key for a predetermined time or more instead of closing the shells, i.e., if the user performs a long key press, the control unit 12 similarly advances from step 2*j* to step 2*m* to return to the normal mode as shown in FIG. 2. Furthermore, if the shells are not closed within a predetermined time since the last key operation is performed and no long key press is performed, the control unit 12 similarly advances from step 2*k* to step 2*m* to return to the normal mode.

Figure 10:
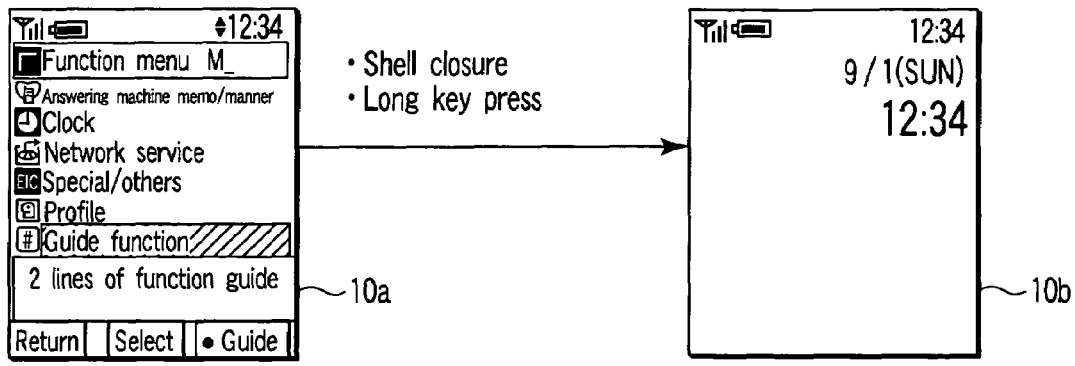
FIG. 10 is a view showing the transition of the display screen when a normal mode is to be restored by terminating the security mode.

Note that return from the security mode to the normal mode is executed not only in the new security member registration window but also in any display window. FIG. 10 shows an example in which the security mode is canceled and the normal mode is restored when the shells are closed while a function menu 10*a* is displayed, when a predetermined key is pressed for a long time, or when a predetermined time elapses without any key operation. After the normal mode is thus restored, a standby image 10*b* is displayed again.

In the normal mode, neither registration nor erase of any security member can be performed, and no menu for registering or erasing a security member is displayed.

(2-2) Setting of Display Color of Clock

Figure 4:
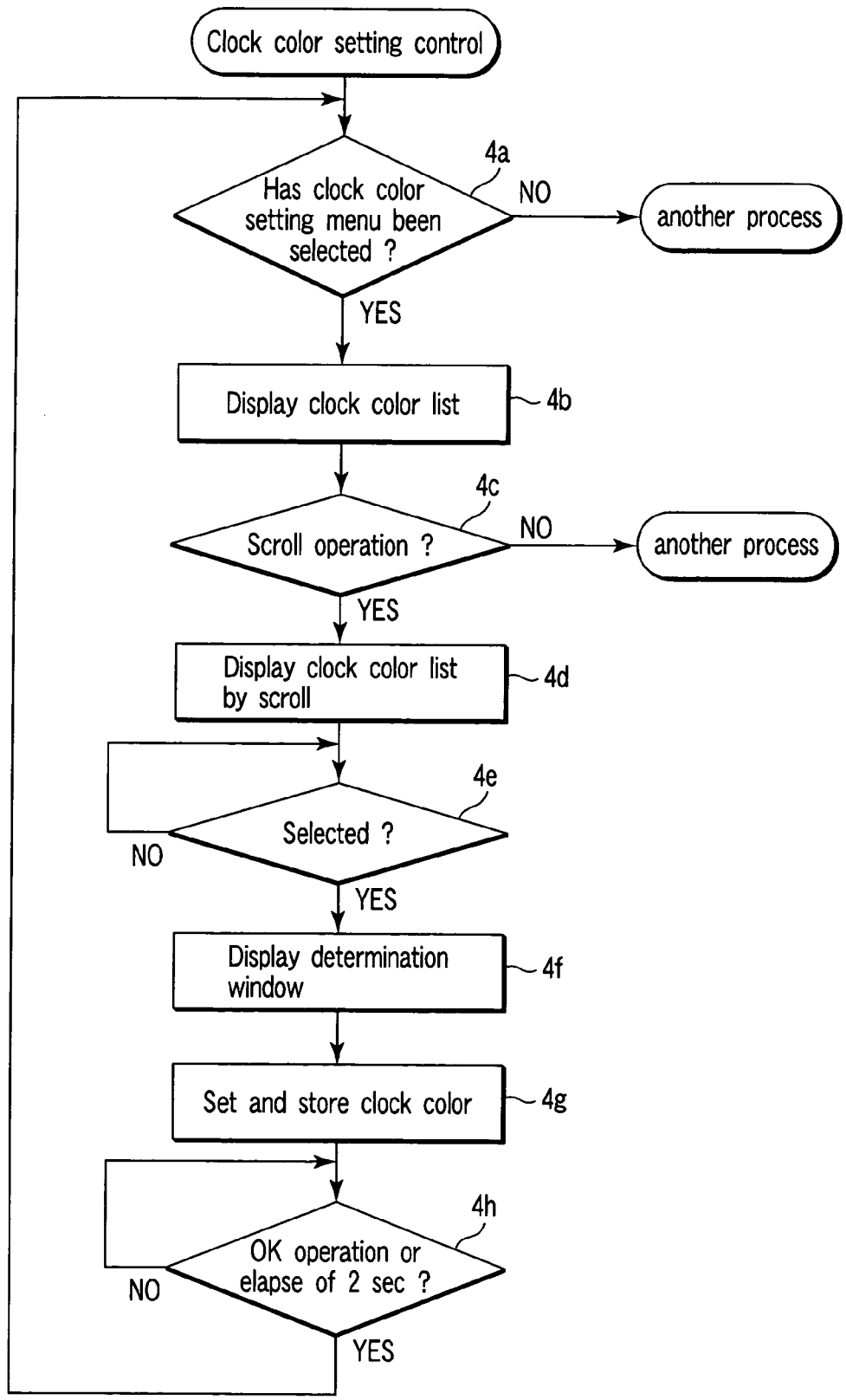
FIG. 4 is a flowchart showing the sequence and contents of information clock color setting control by the mobile phone shown in FIG. 1.
Figure 9:
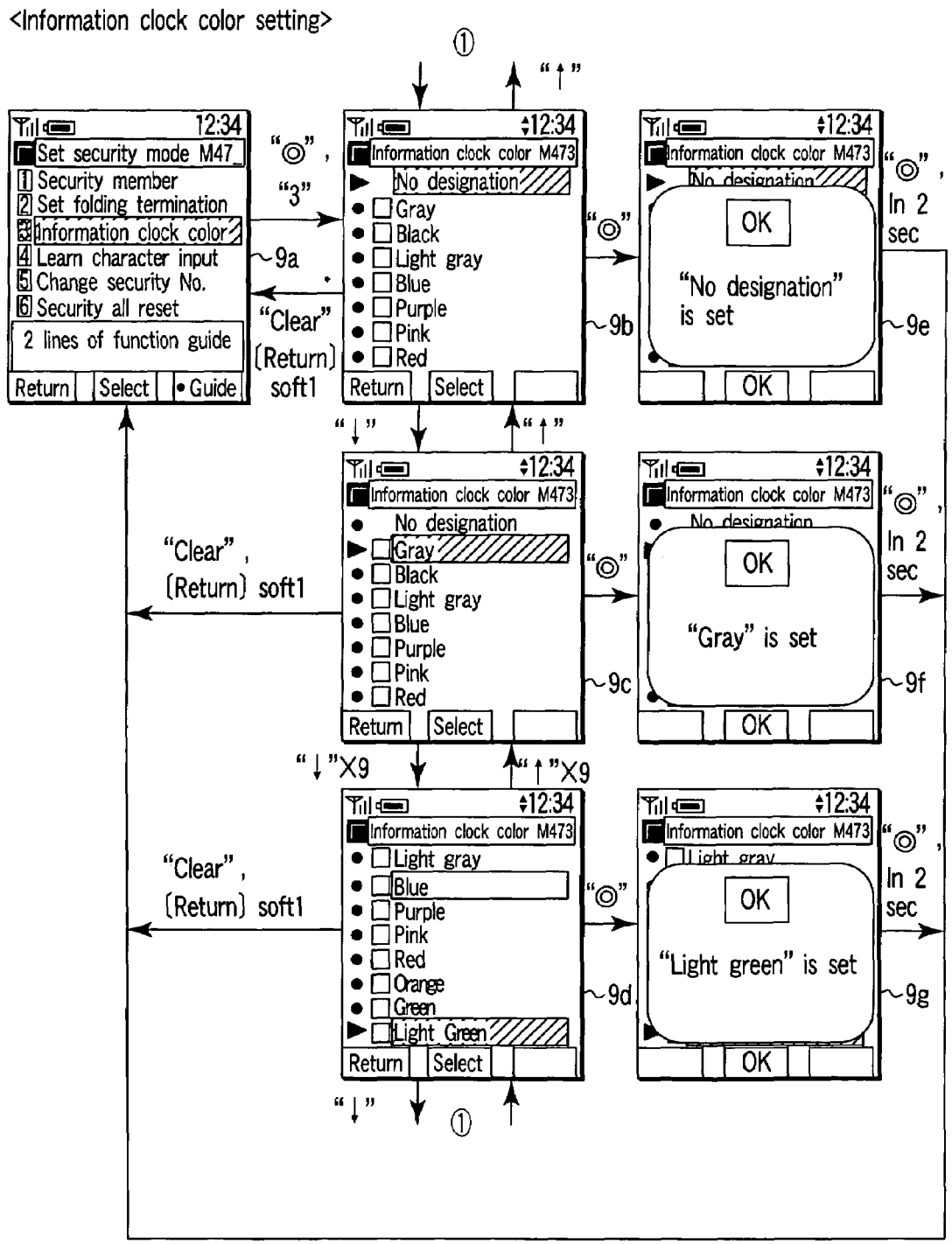
FIG. 9 is a view showing the transition of the display screen when an information clock color is to be set.

In this embodiment, when an incoming call has arrived, the display color of the clock is changed instead of the existing incoming call notification operation, so that only the user can recognize the arrival of the incoming call. To operate this function, the user must preset a color to which the display color of the clock is to be changed. FIG. 4 is a flowchart showing the sequence and contents of this clock display color setting control. FIG. 9 is a view showing the transition of the display screen when the clock display color is to be set.

When the clock color is to be set subsequently to the security member registration process described above, the security mode is already activated. Therefore, the user displays the security mode setting menu, and selects "information clock color" as indicated by 9*a* in FIG. 9. In the normal mode, however, no "information clock color" selecting window is displayed. To set the clock color in the normal mode, therefore, the user first inputs the hidden command following the operation procedure shown in FIG. 7 in the standby image, thereby activating the security mode. Then, the user selects "security mode set menu" from the standby image via the launcher menu, and selects "information clock color", as indicated by 9*a* in FIG. 9, in the displayed security mode set menu.

When in step 4*a* the control unit 12 detects that "information clock color" is selected, the control unit 12 displays a clock color list 9*b* in step 4*b*. In this state, the user puts the cursor on a desired clock color by scroll by using the cursor key, and performs a selecting operation. The control unit 12 detects the cursor operation in step 4c, and scrolls the clock color list in step 4d. The control unit 12 then detects the selecting operation in step 4e, and displays a determination window in step 4f. After that, in step 4g, the control unit 12 stores the selected clock color as an information clock color in the internal memory of the control unit 12.

If, for example, the user puts the cursor on "gray" and performs a selecting operation as indicated by 9c in FIG. 9, the control unit 12 displays a determination window 9f and stores "gray" as an information clock color. Also, if the user puts the cursor on "light green" and performs a selecting operation, the control unit 12 displays a determination window 9g and stores "light green" as an information clock color. On the other hand, if the user does not want the clock color to be changed when an incoming call has arrived, in order to further raise the security, he or she need only put the cursor on "no designation" in the clock color list 9b and performs a selecting operation. As a consequence, the control unit 12 stores "no designation" as an information clock color in the memory.

Note that if the user performs an "OK" operation while the determination window is displayed, or if two seconds elapse since the determination window is displayed, the control unit 12 detects the operation in step 4h, and returns the display window to the security mode set menu window 9a. This prevents the inconvenience that the information clock color determination window is left displayed.

Note that after the information clock color setting described above is complete, if the user closes the shells of the mobile phone or presses a predetermined key for a long time, or if a predetermined time elapses without any key operation, the control unit 12 advances from step 2i, 2j, or 2k to step 2m to terminate the security mode and return to the normal mode as shown in FIG. 2.

(3) Incoming Call Operation

Figure 5:
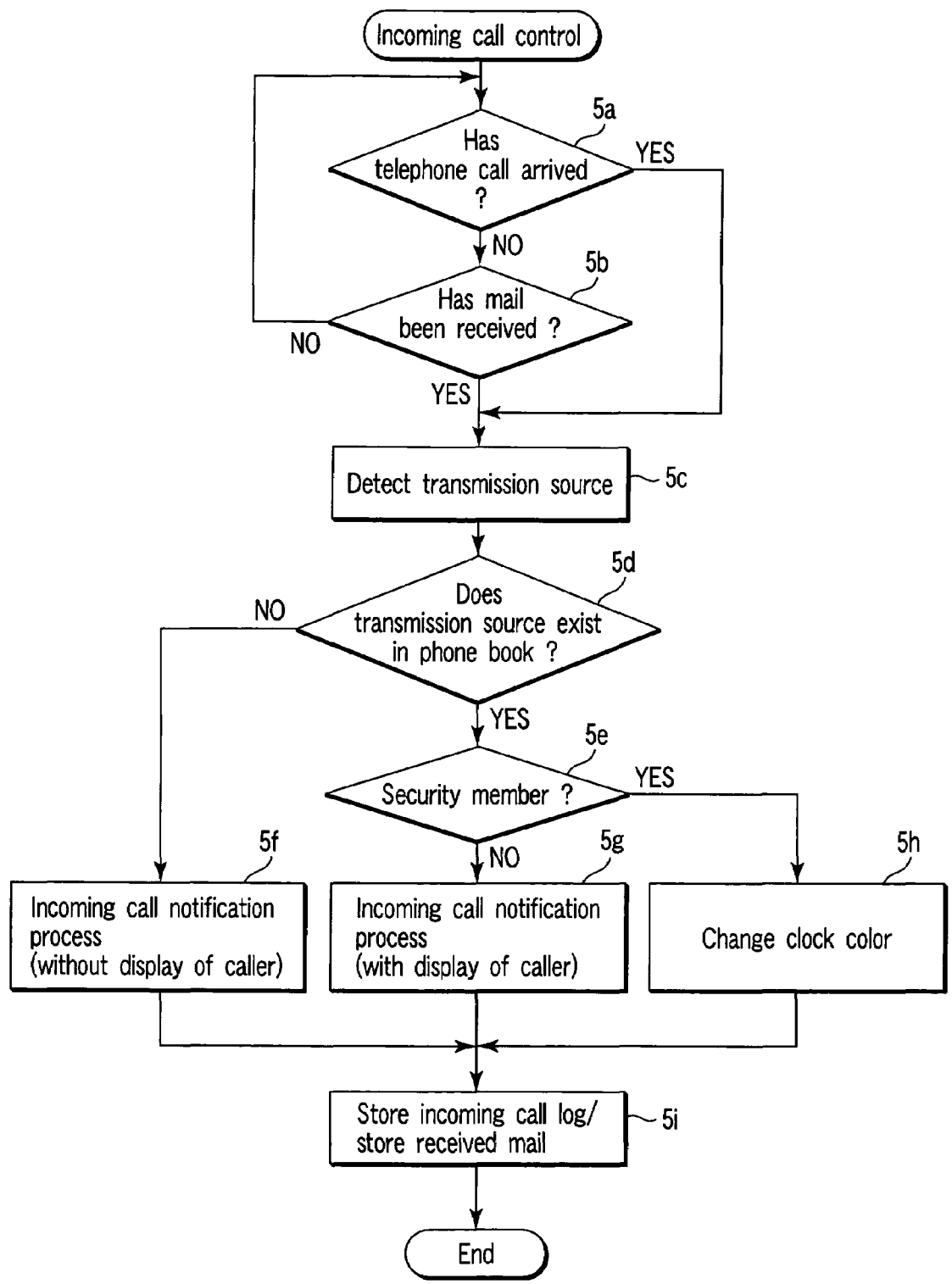
FIG. 5 is a flowchart showing the sequence and contents of incoming call control by the mobile phone shown in FIG. 1.

When an incoming call has arrived in the normal mode, the following incoming call control is executed. FIG. 5 is a flowchart showing the sequence and contents of the control.

That is, in the standby state, the control unit 12 monitors the arrival of a telephone call and the reception of e-mail in steps 5a and 5b, respectively. Assume that in this state, a telephone call has arrived or e-mail is received. In this case, in step 5c, the control unit 12 detects the telephone number of the transmission source from incoming call control information, if the incoming call type is a telephone call. If e-mail is received, the control unit 12 detects the mail address of the transmission source from the mail header. In step 5d, the control unit 12 checks whether communication partner information corresponding to the transmission source is stored in the phone book memory 13a. If YES in step 5d, the control unit 12 checks in step 5e whether this transmission source is a security member.

If no communication partner information corresponding to the transmission source is stored in the phone book memory 13a, the control unit 12 advances to step 5f to perform a normal incoming call notification process. In this incoming call notification process, the control unit 12 generates, e.g., an alarm sound or vibration, and displays, on the display 15, only a message indicating the arrival of the telephone call or the reception of the e-mail. In step 5i, the control unit 12 forms incoming call log data and stores the data in the incoming call log memory 13b, if the incoming call type is a telephone call. If the incoming call type is mail reception, the control unit 12 stores the received e-mail in the mail receiving memory 13c.

In addition, the control unit 12 forms reception log data, and stores the data in the mail receiving memory 13c.

If the transmission source is stored in the phone book memory 13a but is not a security member, the control unit 12 advances to step 5g to perform an incoming call notification process by which the name of the calling person is displayed. In this incoming call notification process, the control unit 12 generates, e.g., an alarm sound or vibration, and displays, on the display 15, a message or icon indicating the arrival of the telephone call or the reception of the e-mail, together with the corresponding communication partner information read out from the phone book memory 13a. In step 5i, the control unit 12 stores the incoming call log or received mail.

Figure 11:
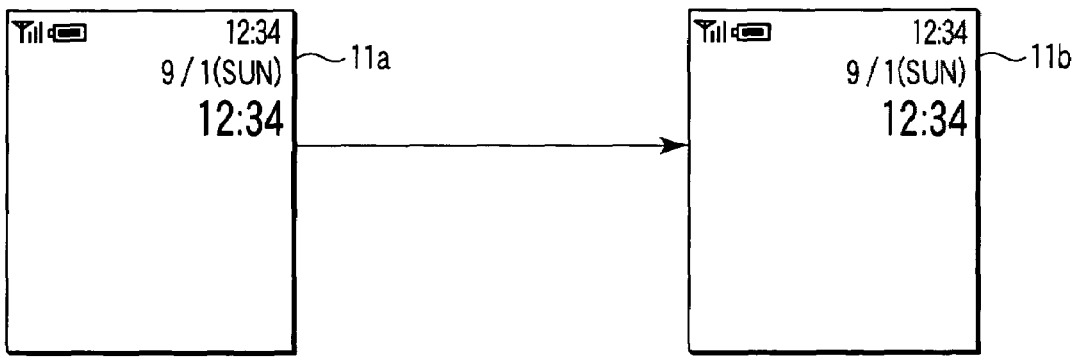
FIG. 11 is a view showing a first display example of means for notifying a user of the arrival of an incoming call from a security member.

On the other hand, if the transmission source is stored in the phone book memory 13a and is also a security member, the control unit 12 advances to step 5h to change the display color of the clock, instead of performing the existing incoming call notification process described above. That is, if a telephone call comes or mail is received from a security member in the state in which a standby image 11a is displayed as shown in FIG. 11, the control unit 12 changes only the display color of the clock to a preregistered "information clock color", without changing the display contents of the standby image 11a as indicated by 11b in FIG. 11. For example, if the normal display color of the clock is "blue" and "gray" is set as the information display color, the display color of the clock is changed to "gray". After that, in step 5i, the control unit 12 stores the incoming call log or received mail.

Since, therefore, the display color of the clock displayed in the standby image is changed to the information clock color preset by the user, he or she can recognize that a telephone call has arrived or mail is received from a security member. Even if a third party borrows or steals the mobile phone, the image displayed on the display 15 remains the standby image, and neither a message nor an icon indicating the arrival of an incoming call is displayed. Therefore, this third person cannot recognize even the arrival of an incoming call, not to mention the name and the like of the calling person.

Figure 6:
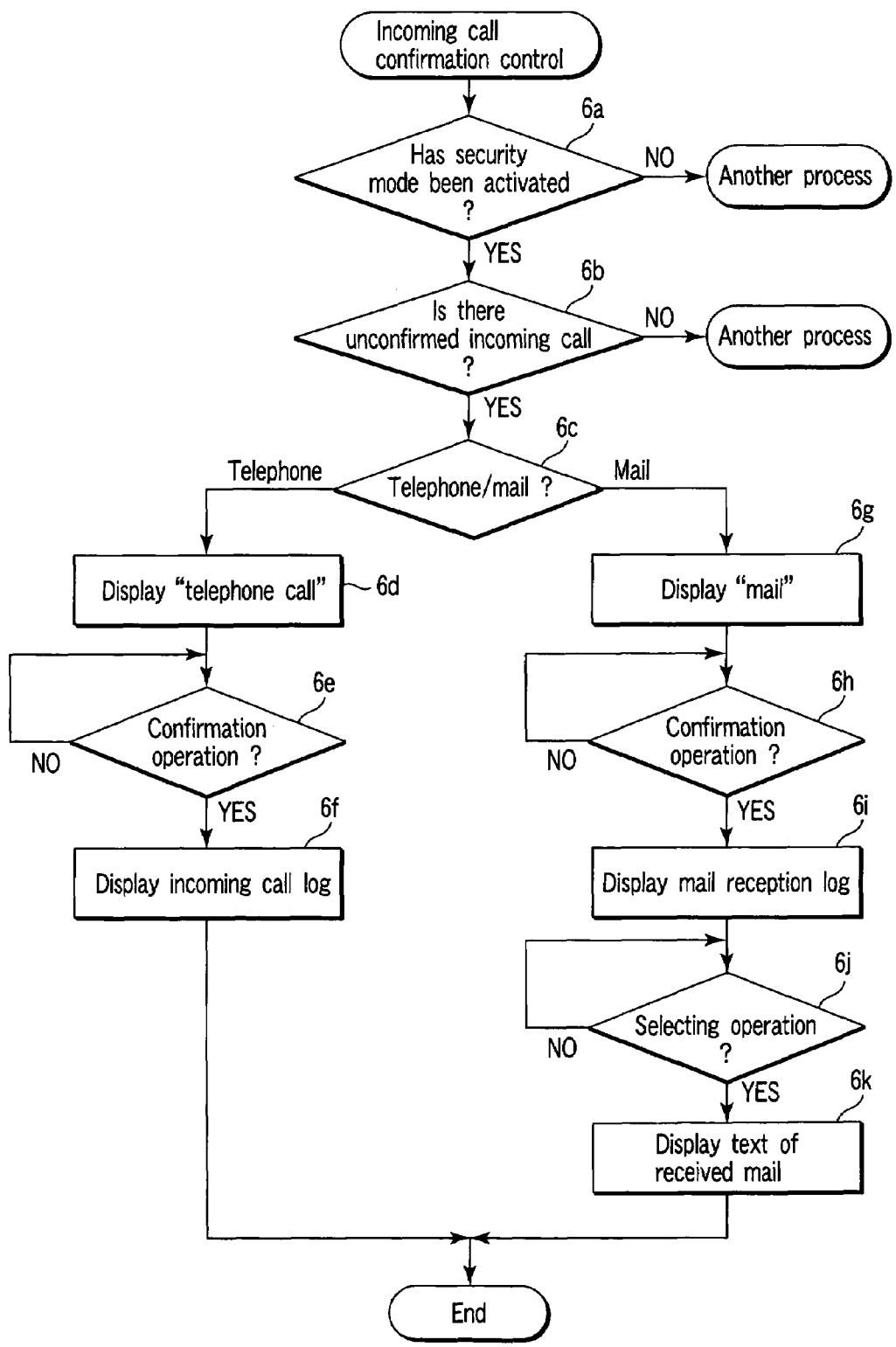
FIG. 6 is a flowchart showing the sequence and contents of incoming call data confirmation control by the mobile phone shown in FIG. 1.

(4) Confirmation of Incoming Call Log Data and Received Mail Stored during Normal Mode Incoming call log data and received mail from a registered security member stored during the normal mode cannot be confirmed in the normal mode, and can be confirmed only when the security mode is activated. FIG. 6 is a flowchart showing the sequence and contents of incoming call data confirmation control.

To confirm incoming call log data and received mail stored during the normal mode, the user first performs an operation of activating the security mode following the procedure shown in FIG. 7. The corresponding control sequence performed by the control unit 12 is as shown in FIG. 2.

When the security mode is activated, the control unit 12 advances from step 6a to step 6b, and checks the presence/absence of an incoming call occurring during the normal mode, on the basis of the incoming call log data and mail reception log data stored in the incoming call log memory 13b and mail receiving memory 13c. If an unconfirmed incoming call occurring during the normal mode is present, the control unit 12 checks in step 6c whether the incoming call type is a telephone call or mail reception.

If the incoming call occurring during the normal mode is a telephone call, the control unit 12 advances to step 6d, and displays a message indicating the presence of the unconfirmed telephone call on the display 15. If the user performs a confirmation operation in this state, the control unit 12 advances from step 6e to step 6f, reads the corresponding incoming call log data from the incoming call log memory 13*b*, and displays the read data on the display 15.

Figure 17:
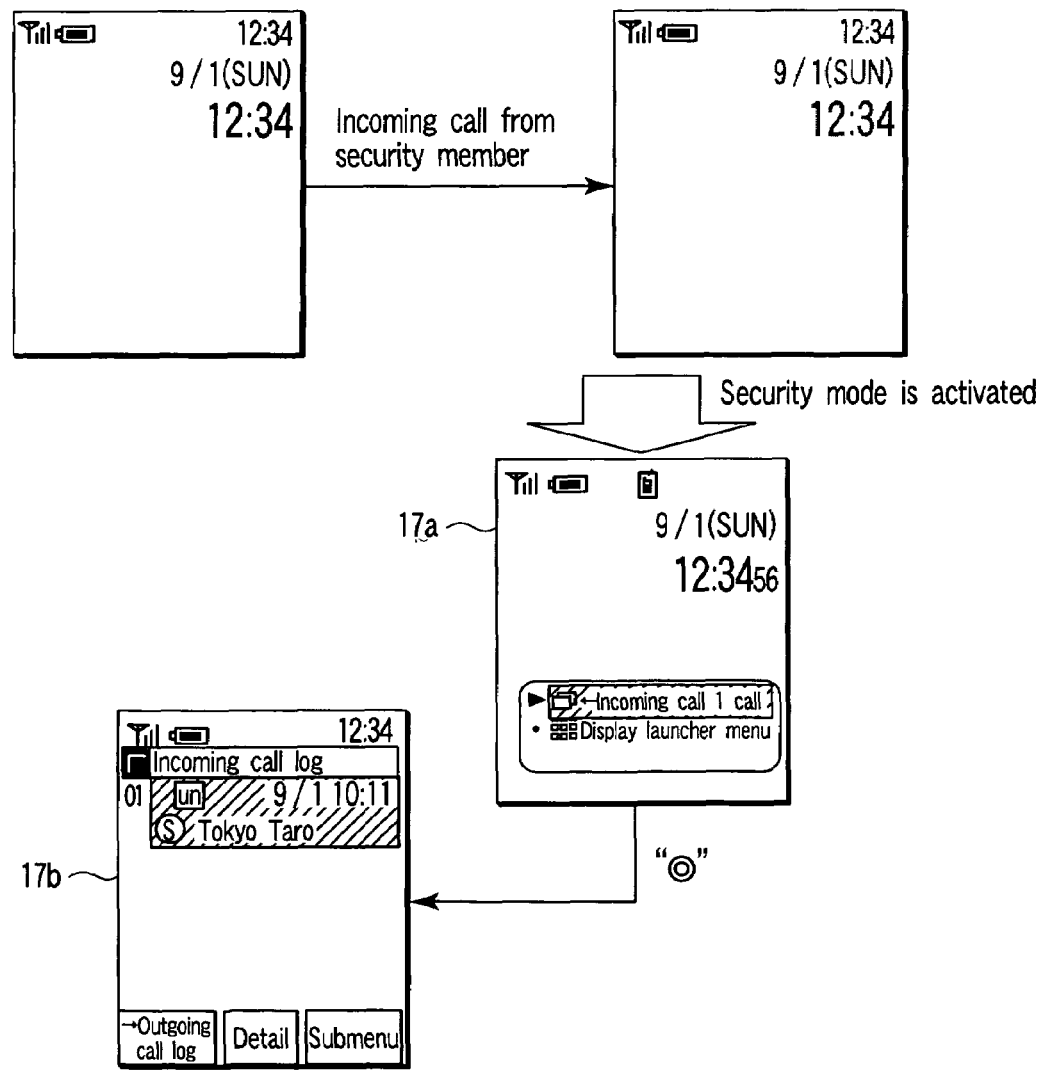
FIG. 17 is a view showing the transition of the display screen when incoming call log data stored during the normal mode is to be checked.

FIG. 17 shows an example of the display image. When the security mode is activated, an "incoming call" message is displayed in the standby image as indicated by 17*a*. If the user performs a confirmation operation in this state, the incoming call log data is displayed as indicated by 17*b*. Therefore, the user can confirm a telephone call from a security member received during the normal mode.

If the incoming call occurring during the normal mode is mail reception, the control unit 12 advances to step 6*g*, and displays, on the display 15, a message indicating that mail received during the normal mode is present. If the user performs a mail confirmation operation in this state, the control unit 12 advances from step 6*h* to step 6*i*, reads the corresponding mail reception log data from the mail receiving memory 13*c*, and displays the read mail on the display 15.

FIG. 18 shows an example of the display image. When the security mode is activated, an "e-mail" message is displayed in the standby image as indicated by 18*a*. If the user performs a confirmation operation in this state, the mail reception log data is displayed as indicated by 18*b*. If the user continues the confirmation operation, the mail text is read out from the mail reception memory 13*c* and displayed. Accordingly, the user can confirm e-mail from a security member received during the normal mode.

Note that after the confirmation of the unconfirmed incoming call is complete, if the user closes the shells of the mobile phone or presses a predetermined key for a long time, or if a predetermined time elapses without any key operation, the control unit 12 advances from step 2*i*, 2*j*, or 2*k* to step 2*m* to terminate the security mode and return to the normal mode as shown in FIG. 2.

(5) Confirmation of Incoming Call Log Data and Mail Reception Log Data

Figure 19A:
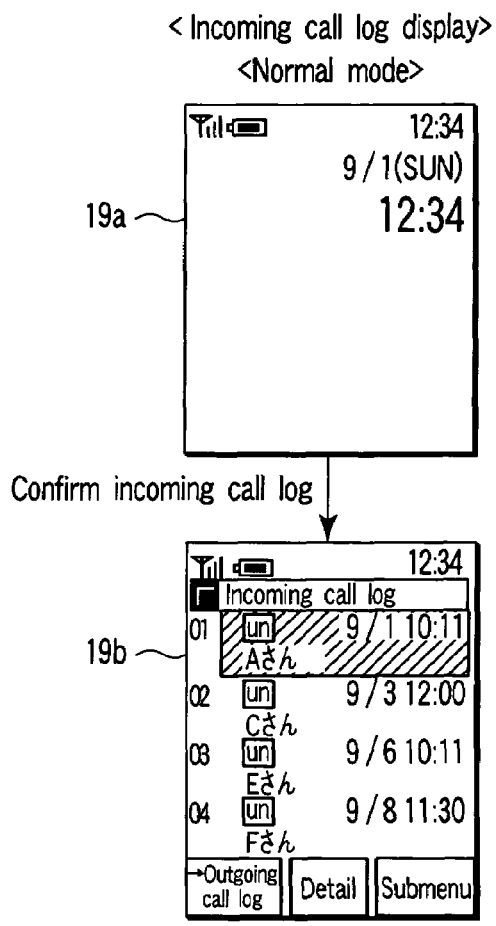
FIGS. 19A and 19B are views showing display examples of incoming call log data in the normal mode and in the security mode.

When the user performs an incoming call log confirmation operation in the normal mode, the control unit 12 selectively reads, from the incoming call log memory 13*b*, the past incoming call log data except for incoming calls from security members. The control unit 12 displays the read past incoming call log data on the display 15. FIG. 19A shows a display example. When an incoming call log confirmation operation is performed while an standby image 19*a* is displayed, incoming call log data 19*b* except for incoming calls from security members is displayed in the form of a list on the display 15.

That is, in the normal mode, log data of incoming calls from security members is excluded, and the rest of the incoming call log data is displayed at narrow intervals. Accordingly, even if a third party tries to confirm the incoming call log, not only the log of incoming calls from security members but also the existences of those security members can be kept secret.

Figure 19B:
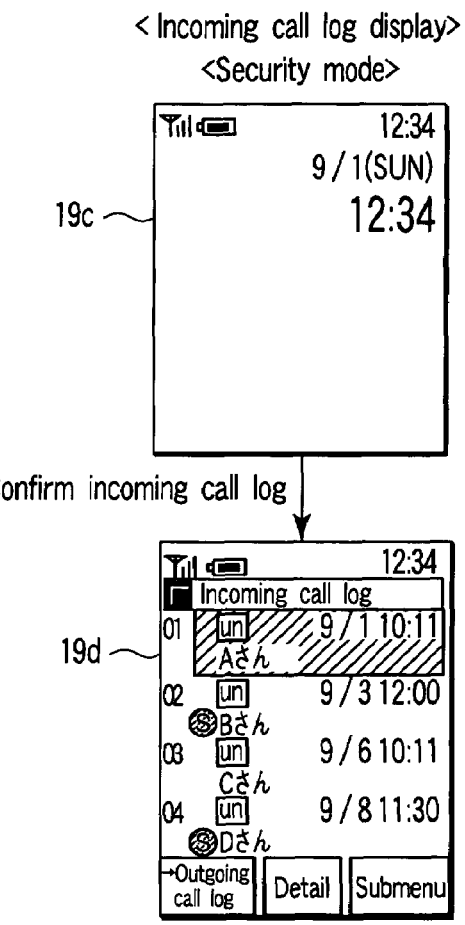

On the other hand, if the user activates the security mode and then performs an incoming call log confirmation operation, the control unit 12 selectively reads out, from the incoming call log memory 13*b*, all the past incoming call log data including incoming calls from security members, and displays all the readout past incoming call log data on the display 15. FIG. 19B shows a display example. When an incoming call log confirmation operation is performed while a standby image 19*c* is displayed after the security mode is activated, all past incoming call log data 19*d* including incoming calls from security members is displayed in the form of a list on the display 15. Note that in FIG. 19B, "un" indicates unconfirmed incoming call log data, and (S) indicates log data of an incoming call from a security member.

Figure 20:
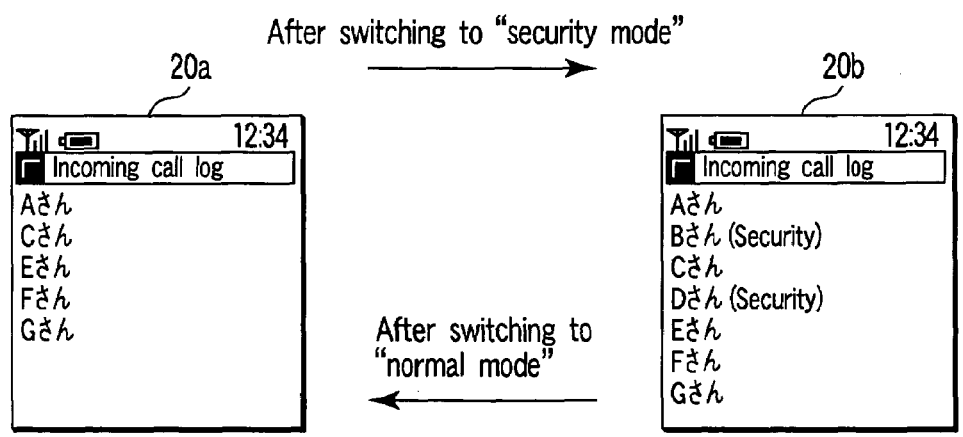
FIG. 20 is a view for explaining the difference between incoming call log data in the normal mode and incoming call log data in the security mode.

That is, as shown in FIG. 20, the log of incoming calls from security members which is not displayed in incoming call log data 20*a* in the normal mode is displayed without exception as indicated by 20*b* when the normal mode is switched to the security mode. This allows the user to thoroughly confirm all the past incoming call log data including incoming calls from security members.

As has been described above, this embodiment achieves the following functions and effects.

(1) Communication partners to be kept secret are registered as security members. When an incoming call has arrived, a normal incoming call notification operation is performed if the transmission source is not a security member, and no incoming call notification operation is performed if the transmission source is a security member.

When an incoming call has arrived, therefore, the incoming call notification operation itself is not performed if the transmission source is a security member. This not only keeps the name and the like of a security member secret, but also keeps the existence of a security member secret. Accordingly, even when a third party borrows or steals the mobile phone, it is possible to prevent a leak of information concerning security members to the third party, and also prevent this information from becoming presumable by the third person. This further raises the secrecy of the information concerning security members.

(2) In addition, when an incoming call from a security member has arrived, the display color of the clock always displayed in the standby image or the like is changed to a display color which the user himself or herself has set and he or she alone knows, instead of an incoming call notification operation. As a consequence, only the user can be informed of this incoming call from the security member without letting any third person to know that.

(3) The normal mode and security mode are prepared, and, only when the security mode is activated, it is possible to register a security member, set the information clock color, and confirm, e.g., the incoming call log and mail reception log related to security members. This prevents a leak of the information concerning security members.

(4) In addition, to active the security mode, input of the hidden command is accepted in the existing display image, such as the standby image or any of the various menu images, in which no guidance pertaining to the security mode is displayed at all. Only when the preregistered hidden command is input in this state, the security mode is activated.

This makes it possible to more reliably protect the information concerning security members from being leaked, and to keep the existence of the security mode secret.

(5) Furthermore, while the security mode is activated, if the user closes the shells of the mobile phone or presses a predetermined key for a long time, or if a predetermined time elapses without any key operation, the security mode is terminated, and the normal mode is restored.

When the security mode is activated, therefore, it is possible to terminate the security mode and restore the normal mode by a simple operation. Also, even when the user forgets the terminating operation and leaves the security mode activated, it is possible to terminate the security mode and restore the normal mode after the elapse of a predetermined time. As a consequence, the information concerning security members and the existence of the security mode can be kept secret more reliably.

Figure 12:
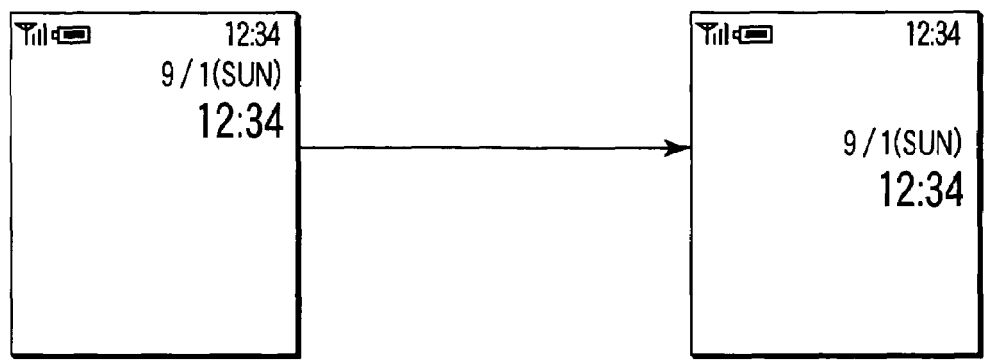
FIG. 12 is a view showing a second display example of the means for notifying a user of the arrival of an incoming call from a security member.
Figure 13:
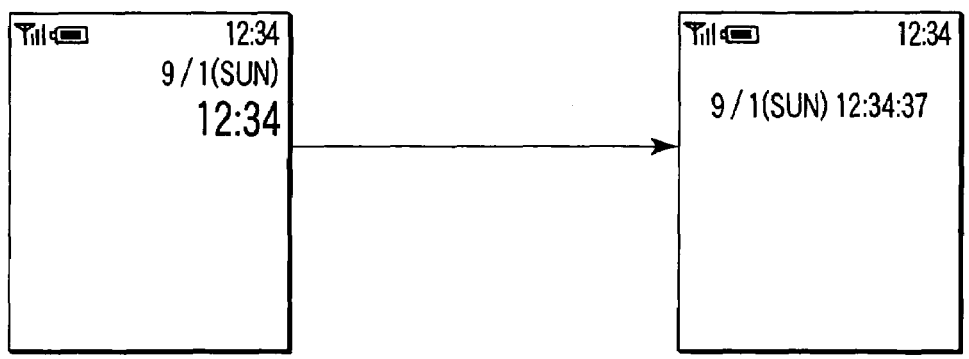
FIG. 13 is a view showing a third display example of the means for notifying a user of the arrival of an incoming call from a security member.

Note that the present invention is not limited to the above embodiment. For example, in the above embodiment, only the user is informed of the arrival of an incoming call by changing the display color of the clock. However, it is also possible to inform only the user of the arrival of an incoming call by changing, e.g., the display position of the clock on the display screen, the display size of the clock, the display density of the clock, or the display type of the clock. FIG. 12 shows an example when the display position of the clock on the display screen is changed. FIG. 13 shows an example when the display size of the clock is changed. The display type of the clock can be changed by, e.g., switching from analog display to digital display or vice versa.

Figure 14:
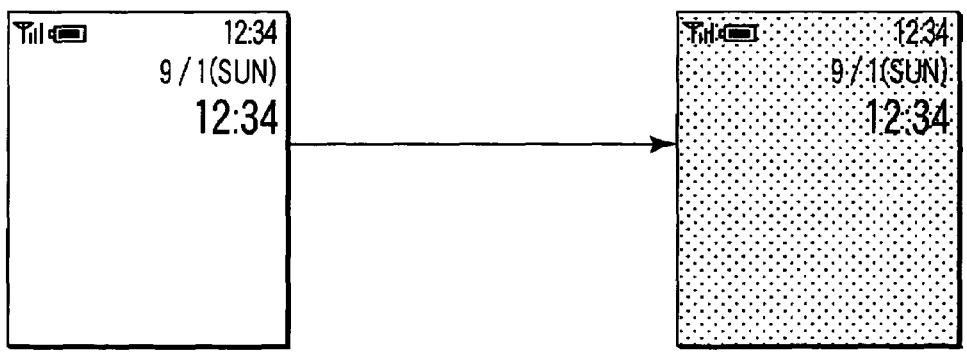
FIG. 14 is a view showing a fourth display example of the means for notifying a user of the arrival of an incoming call from a security member.
Figure 15:
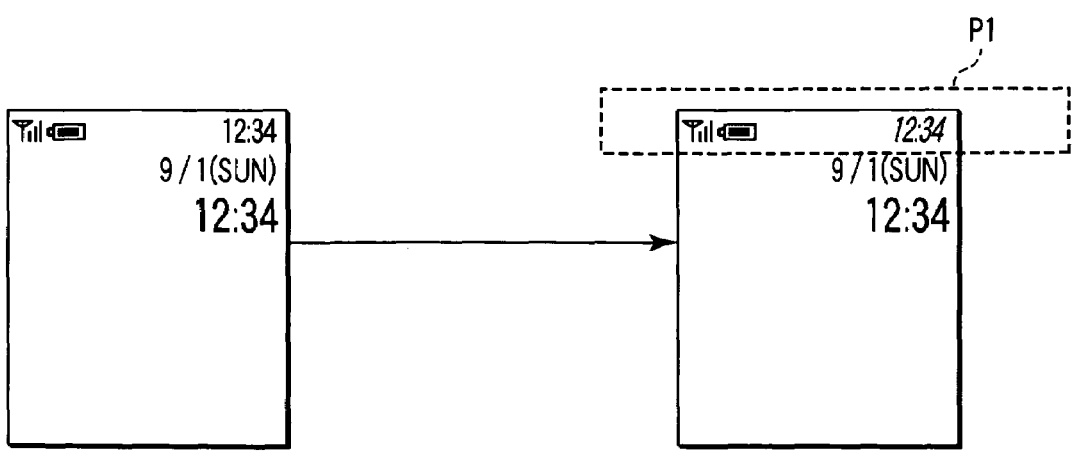
FIG. 15 is a view showing a fifth display example of the means for notifying a user of the arrival of an incoming call from a security member.
Figure 16:
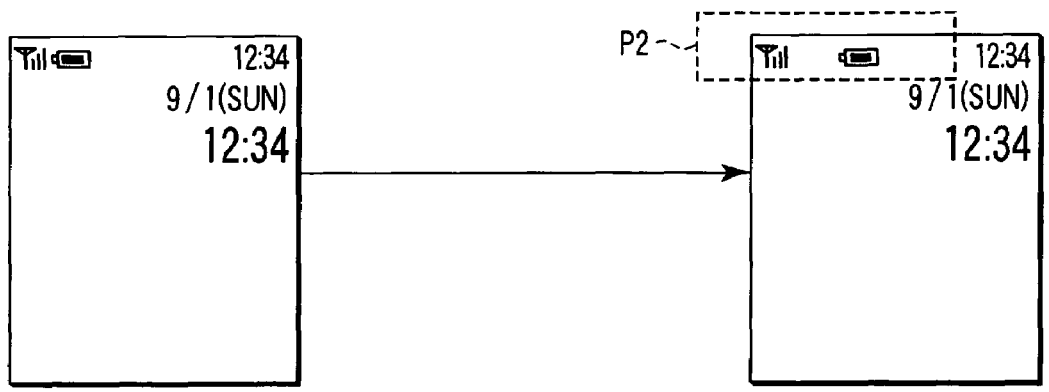
FIG. 16 is a view showing a sixth display example of the means for notifying a user of the arrival of an incoming call from a security member.

Also, as another means for informing only the user of the arrival of an incoming call from a security member, it is possible to use, e.g., a means for changing the background color or the type of wallpaper of the standby image as shown in FIG. 14, a means for changing the design (shape or color) of pictorial information which displays the remaining battery life and the receiving field strength as shown in FIG. 15, or a means for changing the display position or display size of the pictorial information as shown in FIG. 16. Furthermore, it is also possible to change, e.g., the display color, display size, or display position of the clock, pictorial information, or another additional information, without changing its display contents, in a camera photographing frame, mail formation window, or game executing window, as well as in the standby image.

Also, in the above embodiment, only one information clock color can be set. However, different information clock colors can be used for a telephone call and mail reception. In this case, when an incoming call has arrived, the clock color can be changed in accordance with the type of the incoming call. This allows the user to recognize, on the basis of the clock color, whether the type of the incoming call is a telephone call or mail reception.

In addition, the other means for informing only the user of the arrival of an incoming call from a security member, the activation sequence and contents of the security mode, the type of communication terminal, the type of entry data, and the like can be various modified when practiced without departing from the spirit and scope of the present invention.

In conclusion, the present invention is not directly limited to the above embodiment, but can be implemented, when practiced, by modifying the constituent elements without departing from the spirit and scope of the invention. Also, various inventions can be formed by appropriately combining a plurality of constituent elements disclosed in the embodiment. For example, some of all the constituent elements disclosed in the embodiment may also be deleted. Furthermore, constituent elements over different embodiments may also be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication terminal comprising:
a display configured to display data in a first form before an incoming call arrives;
a data memory configured to store entry data;
a first mode setting control module configured to set respective entry data stored in the data memory as secret; and
an incoming call notification control module which is configured to: (i) when the incoming call arrives, check whether entry data corresponding to a transmission source of the incoming call is stored in the data memory, (ii) if entry data corresponding to the transmission source of the incoming call is stored in the data memory, check whether said stored entry data is set as secret, and (iii) if said stored entry data is set as secret, inhibit a normal incoming call notification operation and change a display form of an information item of the display data displayed on the display from the first form to a second form without changing display contents of the display data.

2. The terminal according to claim 1, wherein the incoming call notification control module changes the display form from the first form to the second form by changing at least one of a display color, display type, display position, and display size of the display data.

3. The terminal according to claim 1, wherein the display data includes display data of a clock, and the incoming call notification control module changes the display form from the first form to the second form by changing at least one of a display color, display type, display position, and display size of the display data of the clock.

4. The terminal according to claim 1, wherein the incoming call notification control module comprises:
a checking module configured to check a type of the incoming call; and
a changing module configured to change, in accordance with the incoming call type, the display form of the display data from the first form to a respective different second form corresponding to the incoming call type.

5. The terminal according to claim 1, wherein the incoming call notification control module comprises a form setting module configured to set the second form in accordance with a user's operation.

6. The terminal according to claim 5, further comprising:
a second mode setting control module configured to set a first mode and second mode;
wherein the user's operation to set the second form via the form setting control module is executable in the second mode and is not executable in the first mode.

7. The terminal according to claim 6, wherein the second mode setting control module comprises:
an accepting module configured to accept input of a hidden command when display image data, which does not include a guidance prompting input of the hidden command, is displayed; and
a collating module configured to collate the input hidden command with a prestored hidden command, and to set the second mode if the input hidden command matches the prestored hidden command.

8. The terminal according to claim 6, wherein the communication terminal further comprises first and second housings which are connected to be openable and closeable with respect to each other, and a detecting module configured to detect whether the first and second housings are open or closed, and
wherein the second mode setting control module terminates the second mode and sets the first mode, if it is detected that the first and second housings are closed while the second mode is set.

9. The terminal according to claim 6, wherein the second mode setting control module terminates the second mode and sets the first mode, if no input operation is performed for a preset time while the second mode is set.

10. A communication terminal comprising:
a display configured to display data in a first form before an incoming call arrives;
a data memory configured to store entry data;

a mode setting control module configured to set a first mode and a second mode;

a data setting control module configured to set respective entry data stored in the data memory as secret by an operation which is executable in the second mode and not executable in the first mode; and an incoming call notification control module which is configured to: (i) when the incoming call arrives, check whether entry data corresponding to a transmission source of the incoming call is stored in the data memory, (ii) if entry data corresponding to the transmission source of the incoming call is stored in the data memory, check whether said stored entry data is set as secret, and (iii) if said stored entry data is set as secret, inhibit a normal incoming call notification operation and change a display form of an information item of the display data displayed on the display from the first form to a second form without changing display contents of the display data.

11. The terminal according to claim 10, wherein the mode setting control module comprises:

an accepting module configured to accept input of a hidden command when display image data, which does not include a guidance prompting input of the hidden command, is displayed; and a collating module configured to collate the input hidden command with a prestored hidden command, and to set the second mode if the input hidden command matches the prestored hidden command.

12. The terminal according to claim 10, wherein the communication terminal further comprises first and second housings which are connected to be openable and closeable with respect to each other, and a detecting module configured to detect whether the first and second housings are open or closed, and wherein the mode setting control module terminates the second mode and sets the first mode, if it is detected that the first and second housings are closed while the second mode is set.

13. The terminal according to claim 10, wherein the mode setting control module terminates the second mode and sets the first mode, if no input operation is performed for a preset time while the second mode is set.

14. A communication terminal comprising:

a display configured to display data in a first form before an incoming call arrives;

a data memory configured to store entry data;

a first mode setting control module configured to set respective entry data stored in the data memory as secret;

an incoming call notification control module which is configured to: (i) when the incoming call arrives, check whether entry data corresponding to a transmission source of the incoming call is stored in the data memory, (ii) if entry data corresponding to the transmission source of the incoming call is stored in the data memory, check whether said stored entry data is set as secret, and (iii) if said stored entry data is set as secret, inhibit a normal incoming call notification operation and change a display form of an information item of the display data displayed on the display from the first form to a second form without changing display contents of the display data;

a second mode setting control module configured to set a first mode and a second mode;

a forming and storing control module configured to form and store at least incoming call log information, if the incoming call has arrived; and a confirming control module configured to confirm the stored incoming call log information by an operation which is executable in the second mode and not executable in the first mode.

15. The terminal according to claim 14, wherein the second mode setting control module comprises:

an accepting module configured to accept input of a hidden command when display image data, which does not include a guidance prompting input of the hidden command, is displayed; and a collating module configured to collate the input hidden command with a prestored hidden command, and to set the second mode if the input hidden command matches the prestored hidden command.

16. The terminal according to claim 14, wherein the communication terminal further comprises first and second housings which are connected to be openable and closeable with respect to each other, and a detecting module configured to detect whether the first and second housings are open or closed, and wherein the second mode setting control module terminates the second mode and sets the first mode, if it is detected that the first and second housings are closed while the second mode is set.

17. The terminal according to claim 14, wherein the second mode setting control module terminates the second mode and sets the first mode, if no input operation is performed for a preset time while the second mode is set.

* * * * *